United States Patent

Smiltneek

[15] 3,645,381
[45] Feb. 29, 1972

[54] VIBRATORY CONVEYOR

[72] Inventor: Ralmond J. Smiltneek, Butler, Wis.

[73] Assignee: Logemann Brothers Company, Milwaukee, Wis.

[22] Filed: Aug. 12, 1969

[21] Appl. No.: 849,326

[52] U.S. Cl. ....................................................198/220 CA
[51] Int. Cl. .......................................................B65g 27/00
[58] Field of Search..............198/220 CA, 220 DB; 209/315, 209/365, 365 A, 365 B

[56] References Cited

UNITED STATES PATENTS

| | | | |
|---|---|---|---|
| 1,146,947 | 7/1915 | Norton | 209/365 B |
| 2,935,177 | 5/1960 | Morris | 198/220 |
| 3,019,889 | 2/1962 | Carrier | 198/220 |
| 3,212,629 | 10/1965 | Meader et al. | 198/220 |
| 3,317,041 | 5/1967 | Century | 209/315 |
| 3,308,931 | 3/1967 | Bedan et al. | 198/220 DB |
| 3,292,774 | 12/1966 | Korab | 198/220 DB |

*Primary Examiner*—Richard E. Aegerter
*Assistant Examiner*—Douglas D. Watts
*Attorney*—John W. Michael, Gerrit D. Foster, Bayard H. Michael, Paul R. Puerner, Joseph A. Gemignani, Andrew O. Riteris, Daniel Van Dyke and Spencer B. Michael

[57] ABSTRACT

A vibratory conveyor in which the conveyor deck is supported on a base by elastic connectors which include directional dampers which permit substantially undamped vibratory motion in the plane of the deck, yet, provide significant damping in a direction perpendicular to the deck. The dampers are comprised of rods which are pivotally connected to the underside of the deck and are pivotally connected to a friction slide which is at an inclined angle in respect to the deck and which is spring biased in engagement with a complementing frictional surface of the base.

10 Claims, 2 Drawing Figures

PATENTED FEB 29 1972
3,645,381
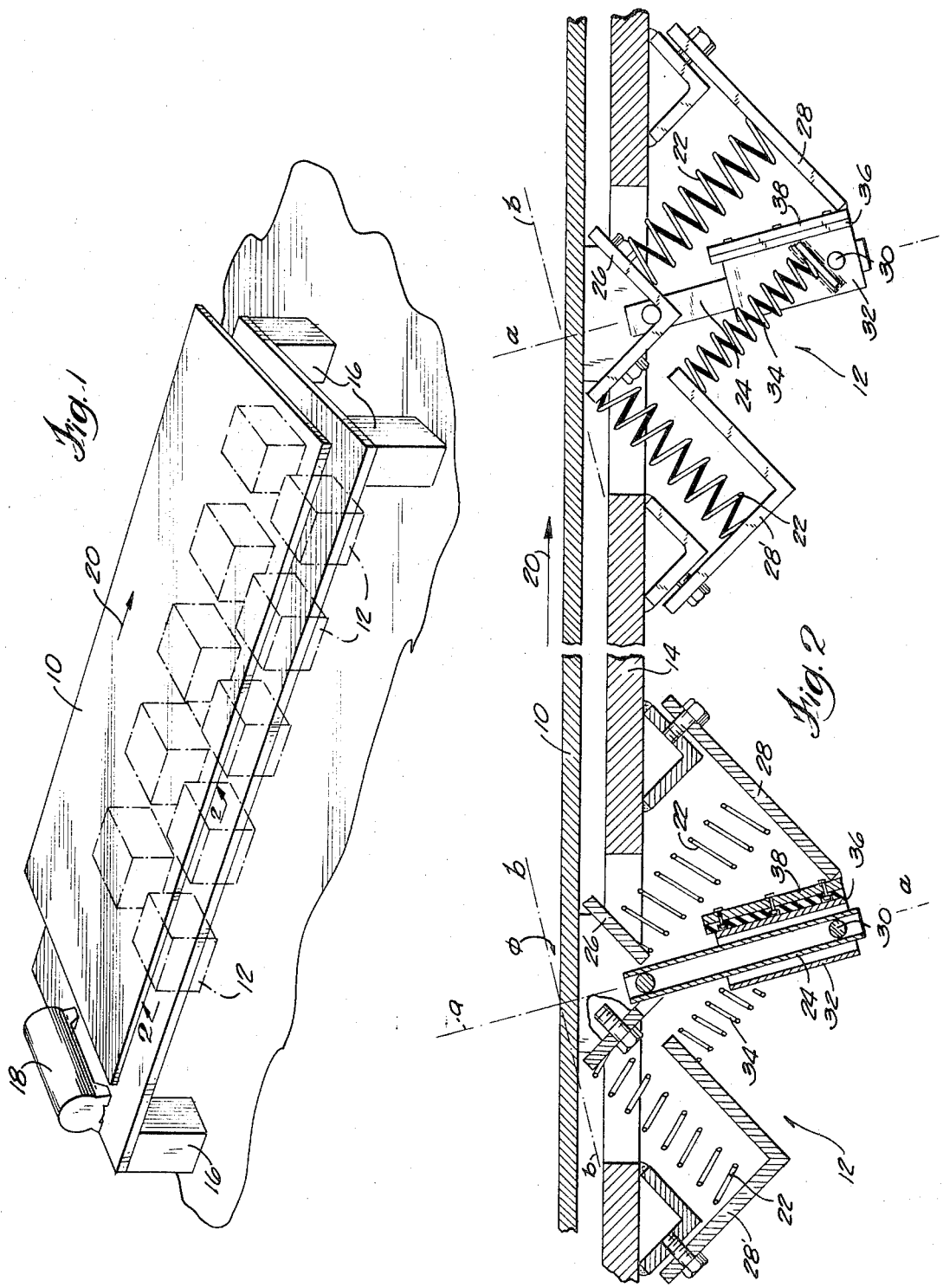
Inventor
Ralmond J. Smittneek
By
Andrew O. Riteris
Attorney

VIBRATORY CONVEYOR

BACKGROUND OF THE INVENTION

1. Field of the Invention

The field of the invention encompasses vibratory conveyors and, particularly, the elastic connection between the deck and base of such conveyors.

2. Description of Prior Art

Prior to the present invention two types of vibratory conveyors have found commercial acceptance. In one type the deck is connected to the base by a series of rigid parallelogram links which are spring biased to a generally vertically inclined position. A driver is mounted on the base and is connected to the deck. A conveyor design of this type is not well suited for shock loading. In the second prior art conveyor, commonly known as a feeder-type conveyor, the driver is rigidly connected to the conveyor deck which is mounted on a suitable foundation by isolators. A conveyor of this type must be made short and rigid or out-of-phase vibration problems may develop.

SUMMARY OF INVENTION

The principal object of the present invention is to provide a vibratory conveyor which will provide undamped motion in a chosen predetermined direction and highly damped motion perpendicular to such direction. In practice the undamped motion is in a direction slightly inclined from the horizontal plane and towards the conveyor's discharge end. A practical application of this concept is a conveyor which has to withstand high direct impact loads as heavy material is placed on the conveyor. Such loading can be anticipated in the scrap metal industry where heavy pieces of material might be dumped by cranes onto a conveyor for transport to a hammer mill scrap baler or similar equipment. A further advantage of directional damping is that it increases the conveyor's capability of conveying heavy loads.

The objects of the present invention are attained by a conveyor in which directional dampers are employed to damp movements in a generally vertical direction, yet, permit substantially undamped motion in the horizontal plane.

A further advantage of directional damping is that it permits the control of the phase relationship of the longitudinal and normal modes of the amplitudes of the vibratory motion and, thus, permits uniform lineal transport of the conveyed material despite variances in the size of the loads imposed on the conveyor.

Another advantage of the present invention is to provide a conveyor design which does not have the size limitations of many of the prior art conveyors and which, therefore, is adaptable for material which has to be conveyed for fairly long distances. This object is attained by supporting the conveyor deck on a base (which is mounted by isolators on the foundation) by two or more rows of elastic connectors which include spring means and directional dampers. This construction permits the use of extremely light support structure, yet, is capable of withstanding high shock loads and of transporting loads over long distances.

DESCRIPTION OF THE DRAWING

FIG. 1 is a schematic perspective view of a vibratory conveyor embodying the present invention with the elastic connectors 12 which support the deck being shown in block form; and FIG. 2 is an enlarged cross-sectional view taken on line 2—2 of FIG. 1 and illustrates the components of the elastic connectors.

DESCRIPTION OF PREFERRED EMBODIMENT

The overall construction of the vibratory conveyor embodying the present invention is illustrated in FIG. 1. The conveyor is comprised of a conveyor deck 10 which is supported by two rows of elastic connectors 12 on a base 14. The number of rows of connectors depends upon the desired width of the conveyor and more rows may be employed if a greater width is required. The base is isolated from its foundation by suitable isolators 16, which are in themselves well known in the art and which normally have a very small natural frequency when compared to the natural frequency of the conveyor. A harmonically varying inertia force driver 18 is mounted on the base to impart the necessary vibratory motion to the conveyor. If desired, the driver can also be mounted on the deck 10. The direction of conveyance is governed by the adjustment of the connectors 12 and, in the disclosed structure, the direction is from left to right, as shown by arrow 20 in FIG. 1.

The deck suspension may be viewed as a spring biased parallelogram linkage in which the lower pivot point of each link is movable along the normal axis of the link and in which such movement is highly damped by a damper. As shown in FIG. 2, each elastic connector includes two compression springs 22,22 which connect the deck to the base and a link 24 the lower pivot of which is movable along axis $a-a$ of the link. The compression springs 22 are positioned at 45° to the deck and are secured by suitable support brackets 26,26 and 28,28[1] to the deck and base, respectively. The positioning of the springs at 90° to each other provides a spring assembly which has a universal spring constant in the fore and aft plane of the conveyor. The link 24 pivots at its upper end in the apex of the bracket 26 and is connected at its lower end by pivot 30 to the hollow slide member 32 of the frictional damper. A compression spring 34 extends between bracket 28[1] and the slide member 30 and presses the latter into engagement with a complementing high friction surface 36 which is mounted on an extension 38 of bracket 28. The spring 34 also serves to preload the springs 22,22. The angle of inclination of axis $a-a$ may be varied by either changing the angle of extension 38 or by other suitable means.

As the driver 18 is energized, the frequency of the vibrations climbs to a point at or about the natural frequency of the deck (including its load) at which point it is stabilized. Under normal loading conditions the vibratory motion of the deck will be confined to the fore and aft direction of lines $b-b$ which is inclined at angle $\phi$ in respect to the deck. Because of the links 24 and the inherent rigidity of the deck, all vibratory motion of the deck will be in phase in both the longitudinal and normal modes and the amplitudes (which are determined by angle $\phi$) in both modes will be constant. Any tendency of the deck to vibrate in a mode along axis $a-a$ will be immediately damped out by the frictional engagement of slide member 30 with the friction surface 36.

Upon changes in the load of the conveyor and upon impact loads, as might be expected in instances where the conveyor is loaded by an electromagnetic crane or a grapple, the relative normal position of the deck in respect to the base changes to conform to the load or shock. In such cases the frictional dampers damp the relative movement of the deck along lines $a-a$ and permit the deck to quickly assume a stabilized position in which the deck's motion continues to be confined to motion in a direction of lines $b-b$.

An important secondary feature of the disclosed conveyor is its unusual capability to adapt to a wide range of transport loads without seriously diminishing the conveying capability. This capability is illustrated by the case in which the load on the conveyor is of such mass that the oscillations close to the natural frequency of the deck (plus load) produce inertia forces which exceed the friction forces between the load and deck. In the absence of the directional damper the deck would "break free" from the load and the load would remain stationary despite oscillation of the deck. In the disclosed conveyor, the force which is exerted by the frictional damper changes direction by 180° twice during each cycle and produces a higher force at the interface between the load and deck as the deck moves forward than when the deck moves backward. This difference in the forces at the interface results in a net friction force vector which acts on the load in the conveying direction and, thus, produces the desired transport. This is achieved with substantially small vertical amplitude and, thus, results in a smooth action in comparison with other types of vibratory conveyors carrying unusually heavy loads.

What is claimed is:

1. A vibratory conveyor comprising;
   a base member adapted to be isolated from the foundation on which it is to be placed;
   a deck member adapted to transport the load of the conveyor;
   elastic connector means supporting said deck member on said base member;
   vibration inducing means mounted on one of said members; and,
   link means connected by a first pivotal connecting means to said deck member and connected by a second pivotal connecting means to said base member to normally limit the movement of deck member in respect to said base members to a predetermined path; and
   damping means including means permitting movement of one of said members in respect to the other of said members in a direction of the longitudinal axis of said link means; and
   including means which damp said movement in a direction of said longitudinal axis yet does not damp the pivotal movement of said link means in respect to said deck and base members;
   said directional damping means being comprised of frictional damper means which is positioned between one of said pivotal connecting means and one of said members; and which includes mating friction surfaces which extend in a direction of the longitudinal axis of said link means when said deck member is in its normal position.

2. A vibratory conveyor according to claim 1 wherein said elastic connector means is comprised of a plurality of spring assemblies which are positioned in a spaced relationship to each other in a fore and aft direction in respect to the conveyor, with each spring assembly having two springs (both connected to said deck and base) one of which is inclined towards the discharging end of the conveyor and the other of which is inclined towards the loading end of the conveyor.

3. A vibratory conveyor according to claim 2 wherein each of said two springs is at a 45° angle in respect to said deck member.

4. A vibratory conveyor according to claim 3 wherein said link means is comprised of a plurality of links each of which is positioned between the said two springs of a separate spring assembly; and wherein said directional damping means is comprised of frictional dampers which are incorporated in each of said spring assemblies, said frictional dampers comprising:
   a frictional slide member pivotally connected to the lower end of said links;
   a frictional surface connected to said base member and inclined along a line extending upwardly and towards the loading end of the conveyor; and
   spring means connected to said base and biasing said frictional slide member into contact with said frictional surface.

5. A vibratory conveyor according to claim 4 wherein said spring means of the frictional damper exerts a force on said slide member in a direction downwardly and towards the discharge end of the conveyor.

6. A vibratory conveyor according to claim 5 wherein said frictional surface is connected to said base member by adjustment means which is operable to vary the position of said surface in respect to said base member.

7. A vibratory conveyor according to claim 1 wherein said longitudinal axis, when said deck member is in its normal position, extends in a downwardly and forwardly direction towards the discharge end of the conveyor.

8. A vibratory conveyor according to claim 7 wherein said frictional damping means is comprised of slide member means which is connected to said second pivotal connecting means, a frictional surface means connected to said base member, and spring means biasing said slide into frictional contact with said friction surface.

9. A vibratory conveyor comprising
   a base member adapted to be isolated from the foundation on which it is to be mounted;
   a deck member adapted to transport the load of the conveyor;
   vibration inducing means mounted on one of said members to induce vibratory motion to said deck member in a predetermined direction to transport said load;
   a plurality of spring assemblies supporting said deck member on said base, said spring assemblies positioned in a spaced relationship to each other in a fore and aft direction in respect to the conveyor, with said spring assemblies having two springs (both connected to said deck and base members) one of which is inclined toward the discharging end of the conveyor and the other of which is inclined towards the loading end of the conveyor; and
   directional frictional damping means incorporated into each of said spring assemblies comprising
   a connecting rod pivotably connected to said deck member at a location between the connection of said two springs to said deck member;
   a frictional slide member pivotally connected to the lower end of said connecting rod;
   a frictional surface connected to said base member and inclined along a line extending upwardly and towards the loading end of the conveyor; and
   spring means connected to said base and biasing said frictional slide member into contact with said frictional surface.

10. A vibratory conveyor comprising
    a base member adapted to be isolated from the foundation on which it is to be placed;
    a deck member adapted to transport the load of the conveyor;
    vibration inducing means mounted on one of said members to induce vibratory movement to said deck member in a predetermined direction to transport said load;
    elastic connector means supporting said deck member on said base member, said connector means adapted to permit substantially undamped vibratory motion of said deck member in a plane corresponding to said predetermined direction; and
    a plurality of frictional dampeners positioned in a spaced relationship to each other in the fore and aft direction in respect to the conveyor and positioned to damp motion of said deck member in the direction of a line extending downwardly and forwardly towards the discharge end of the conveyor, said frictional dampeners including
    connecting rod means which is pivotally connected at its upper end to said deck member and is pivotally connected at its lower end to a slide member which is biased into frictional contact with a friction surface which is connected to said base member, said friction surface extending in the direction of said line.

* * * * *